US011829193B2

United States Patent
Shukla et al.

(10) Patent No.: US 11,829,193 B2
(45) Date of Patent: Nov. 28, 2023

(54) METHOD AND SYSTEM FOR SECURE ONLINE-LEARNING AGAINST DATA POISONING ATTACK

(71) Applicant: Tata Consultancy Services Limited, Mumbai (IN)

(72) Inventors: Manish Shukla, Pune (IN); Rosni Kottekulam Vasu, Pune (IN); Sachin Premsukh Lodha, Pune (IN); Sanjay Seetharaman, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 359 days.

(21) Appl. No.: 17/400,328

(22) Filed: Aug. 12, 2021

(65) Prior Publication Data
US 2022/0050928 A1 Feb. 17, 2022

(30) Foreign Application Priority Data
Aug. 14, 2020 (IN) .............................. 202021035181

(51) Int. Cl.
  *G06F 21/64* (2013.01)
  *G06N 20/00* (2019.01)
  *G06F 21/57* (2013.01)

(52) U.S. Cl.
  CPC .............. *G06F 21/64* (2013.01); *G06F 21/57* (2013.01); *G06N 20/00* (2019.01)

(58) Field of Classification Search
  CPC .......... G06F 21/64; G06F 21/57; G06N 20/00
  (Continued)

(56) References Cited

U.S. PATENT DOCUMENTS

2019/0251479 A1* 8/2019 Anderson ........... H04L 63/1466
2020/0019821 A1 1/2020 Baracaldo-Angel et al.
(Continued)

FOREIGN PATENT DOCUMENTS

CN 113343225 A * 9/2021 ............ G06F 21/55
CN 114565106 A * 5/2022
(Continued)

OTHER PUBLICATIONS

Jiang et al., "A Flexible Poisoning Attack Against Machine Learning," ICC 2019—2019 IEEE International Conference on Communications (ICC), Shanghai, China, 2019, pp. 1-6, doi: 10.1109/ICC.2019.8761422. (Year: 2019).*
(Continued)

Primary Examiner — Peter C Shaw
(74) Attorney, Agent, or Firm — Finnegan, Henderson, Farabow, Garrett & Dunner LLP

(57) ABSTRACT

This disclosure relates generally to online learning against data poisoning attack. Conventional methods used data sanitization techniques for online learning against data poisoning attack. However, these methods do not remove poisoned data points from training dataset completely. Embodiments of the present disclosure method provide an influence based defense method for secure online learning against data poisoning attack. The method initially filters a subset of poisoned data points in the training dataset for training a machine learning model using data sanitization technique. Further the method computes an influence of the data points and performs an influence minimization based on a predefined threshold. Updated data points for the learning model are generated and used for training the machine learning model. The disclosed method can be used against data poisoning attacks in applications such as spam filtering, malware detection, recommender system and so on.

11 Claims, 6 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 2020/0050945 | A1* | 2/2020 | Chen | G06F 18/214 |
| 2020/0387833 | A1* | 12/2020 | Kursun | G06F 21/562 |
| 2021/0256125 | A1* | 8/2021 | Miller | G06F 21/566 |
| 2022/0050928 | A1* | 2/2022 | Shukla | G06F 21/57 |
| 2022/0224717 | A1* | 7/2022 | Achan | G06Q 30/0185 |
| 2023/0148116 | A1* | 5/2023 | Stokes, III | G06F 21/552 |
| | | | | 726/23 |
| 2023/0231875 | A1* | 7/2023 | Baracaldo-Angel | |
| | | | | G06F 18/217 |
| | | | | 726/22 |

FOREIGN PATENT DOCUMENTS

| | | | | | |
|---|---|---|---|---|---|
| CN | 115907029 | A | * | 4/2023 | |
| CN | 116127178 | A | * | 5/2023 | |
| CN | 113723220 | B | * | 8/2023 | G06N 40/16 |

OTHER PUBLICATIONS

Oprea et al., "Poisoning Attacks Against Machine Learning: Can Machine Learning Be Trustworthy?," in Computer, vol. 55, No. 11, pp. 94-99, Nov. 2022, doi: 10.1109/MC.2022.3190787. (Year: 2022).*

Xue et al., "Machine Learning Security: Threats, Countermeasures, and Evaluations," in IEEE Access, vol. 8, pp. 74720-74742, 2020, doi: 10.1109/ACCESS.2020.2987435. (Year: 2020).*

Paudice et al., "Detection of Adversarial Training Examples in Poisoning Attacks through Anomaly Detection," arXiv.1802.03041, Feb. 8, 2018. (Year: 2018).*

Munoz-Gonzalez et al., "Towards Poisoning of Deep Learning Algorithms with Back-gradient Optimization," arXiv: 1708.08689, Aug. 29, 2017. (Year: 2017).*

Venkatesan et al., "Poisoning Attacks and Data Sanitization Mitigations for Machine Learning Models in Network Intrusion Detection Systems," MILCOM 2021—2021 IEEE Military Communications Conference (MILCOM), San Diego, CA, USA, 2021, pp. 874-879, doi: 10.1109/MILCOM52596.2021.9652916. (Year: 2021).*

Collinge et al., "Defending against Poisoning Attacks in Online Learning Settings," (2019).

Fang et al., "Influence Function based Data Poisoning Attacks to Top-N Recommender Systems," (2020).

Koh et al., "Stronger Data Poisoning Attacks Break Data Sanitization Defenses," (2018).

Zhang et al., "Practical Data Poisoning Attack against Next-Item Recommendation," (2020).

* cited by examiner

METHOD AND SYSTEM FOR SECURE ONLINE-LEARNING AGAINST DATA POISONING ATTACK

PRIORITY CLAIM

This U.S. patent application claims priority under 35 U.S.C. § 119 to Indian provisional patent application no. 202021035181, filed on Aug. 14, 2020. The entire contents of the aforementioned application are incorporated herein by reference.

TECHNICAL FIELD

The disclosure herein generally relates to the field of machine learning model, and, more particularly, to a method and a system for secure online-learning against data poisoning attack.

BACKGROUND

Machine learning models trained on data resources from external or internal data sources pose a serious threat as data can be readily poisoned by an adversary. Data poisoning attack is a type of adversarial attack on training data, where an attacker manipulates a fraction of training data, thereby degrading the performance of the machine learning model. Therefore, applications which use these machine learning model that rely on external data-sources for training data are at a significantly higher risk.

There are several known defensive mechanisms that can help in mitigating the threat from data poisoning attacks. Prior work on data poisoning defense primarily focused on offline setting, wherein all the data is assumed to be available for analysis. Defensive measures for online learning, where data points arrive sequentially, have not garnered similar interest.

Defensive mechanisms have been employed to mitigate the threats from data poisoning attacks. Data sanitization is one of a defensive mechanism in which the learning model rejects samples residing sufficiently far from the set of training instances. In few other prior art methods, defenses have majorly focused on the batch setting. The batch setting essentially refers to the offline scenario where bulk of the data is available for analysis. The prior methods provide methods to identify the poisoned data points as outliers and avert them from entering into the training process of the machine learning models. But the prior solutions do not remove the poisoned data points completely. The challenge is always there to identify the vulnerabilities of the applications with online learning under different data poisoning attacks.

Outlier detection is another common defense strategy, wherein the objective is to remove the training data points that substantially deviate from the normal. Such approaches are well suited for removing typical noises in the data, but not for removing certain well-crafted adversarial noises. Also, these defensive approaches cannot remove all the poisoned data points from the data stream. In one prior method, two classes of defense are considered: fixed defense and data-dependent defense with distinct outlier detection rules. Another prior method introduced a defense strategy based on K-Nearest Neighbor (K-NN) that requires a trusted dataset. The requirement of a trusted dataset makes the approach unrealistic and impractical. Moreover, approaches that rely on a trusted dataset are vulnerable to the adversaries who can tamper it.

SUMMARY

Embodiments of the present disclosure present technological improvements as solutions to one or more of the above-mentioned technical problems recognized by the inventors in conventional systems. For example, in one embodiment, a method for secure online-learning against data poisoning attack is provided.

In an aspect, a processor implemented method for secure online-learning against data poisoning attack is provided. The method includes: receiving sequentially a training set comprising a plurality of data points, wherein a machine learning model is trained online based on the training set; and iteratively performing a set of steps for each data point of the plurality of data points to update a model parameter associated with the machine learning model wherein the updated model parameter is used for training the machine learning model, wherein the set of steps comprises: computing an influence corresponding to the data point of a current iteration on the model parameter using an influence function; computing a threshold based on influences corresponding to a set of data points of previous iterations within a predefined influence window size; updating the data point of the current iteration based on a comparison between the influence of the data point of the current iteration and the computed threshold; and updating the model parameter based on the updated data point of the current iteration.

In another aspect, a system for secure online-learning against data poisoning attack is provided. The system comprises memory storing instructions; one or more communication interfaces; and one or more hardware processors coupled to the memory via the one or more communication interfaces, wherein the one or more hardware processors are configured by the instructions to receive sequentially a training set comprising a plurality of data points, wherein a machine learning model is trained online based on the training set; and iteratively perform a set of steps for each data point of the plurality of data points to update a model parameter associated with the machine learning model wherein the updated model parameter is used for training the machine learning model, wherein the set of steps comprises: computing an influence corresponding to the data point of a current iteration on the model parameter using an influence function; computing a threshold based on influences corresponding to a set of data points of previous iterations within a predefined influence window size; updating the data point of the current iteration based on a comparison between the influence of the data point of the current iteration and the computed threshold; and updating the model parameter based on the updated data point of the current iteration.

In an embodiment, wherein a set of data points from amongst the plurality of data points are poisoned data points.

In an embodiment, wherein the step of computing the influence corresponding to the data point of the current iteration is preceded by checking whether the data point of the current iteration lies in a filtered data set obtained using a sanitization technique.

In an embodiment, wherein the set of steps to update the model parameter is performed only if the data point of the current iteration lies in the filtered data set.

In an embodiment, wherein the influence function includes (i) a computed Hessian and (ii) a computed gradient loss parameter associated with the machine learning model.

In an embodiment, wherein updating the data point of the current iteration based on the comparison between the influence of the data point of the current iteration and the threshold comprises: computing a new data point using a minimization technique if the influence of the data point of the current iteration is greater than the threshold; and updating the data point of the current iteration with the new data point if the influence of the data point of the current iteration is greater than an influence of the new data point.

In an embodiment, wherein the threshold is computed by calculating an average of the influences corresponding to the set of data points of previous iterations within the influence window size.

In yet another aspect, there are provided one or more non-transitory machine readable information storage mediums comprising one or more instructions which when executed by one or more hardware processors causes at least one of: receiving sequentially a training set comprising a plurality of data points, wherein a machine learning model is trained online based on the training set; and iteratively performing a set of steps for each data point of the plurality of data points to update a model parameter associated with the machine learning model wherein the updated model parameter is used for training the machine learning model, wherein the set of steps comprises: computing an influence corresponding to the data point of a current iteration on the model parameter using an influence function; computing a threshold based on influences corresponding to a set of data points of previous iterations within a predefined influence window size; updating the data point of the current iteration based on a comparison between the influence of the data point of the current iteration and the computed threshold; and updating the model parameter based on the updated data point of the current iteration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
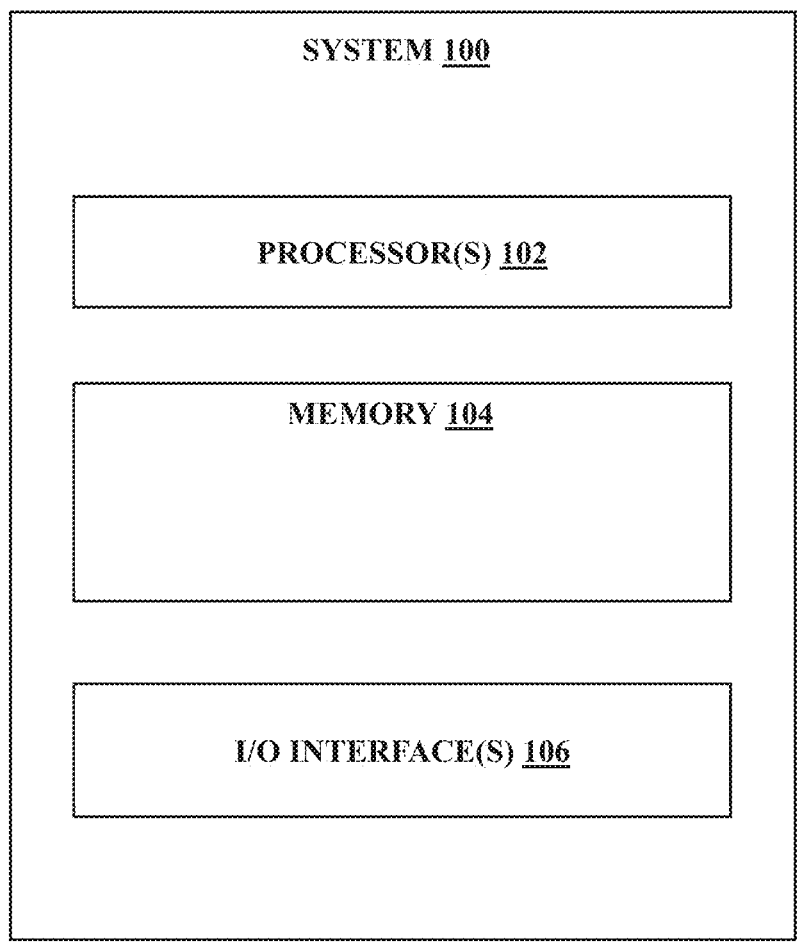
FIG. 1 illustrates an exemplary block diagram of a system for secure online-learning against data poisoning attack, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In an embodiment, a machine learning model may be alternatively referred as learning model or model or interchangeably herewith. A brief explanation on various types of attacks on the training data of the machine learning model is provided below.

Various critical applications use machine learning models for obtaining expected results. Data-driven technologies have shown significant performance improvement in many critical applications. Most enterprises use data from multiple sources to provide quality applications. The reliability of these data sources raises concerns for the security of the machine learning techniques adopted. Thus, it is important for ML models to be secure against adversaries. Supervised learning is one of the machine learning techniques. The supervised learning generally consists of three phases: (i) a training phase where a training data is provided to the learning algorithm as input to train the machine learning model. The output of this is a trained machine learning model (ii) a validation phase where a validation dataset is used to tune hyperparameters of the machine learning model (iii) a testing phase where an output is predicted for a new input data (test data) using the trained machine learning model. The adversary can either attack the training data or the test data with an aim to degrade the model performance which may lead to evading the model or steal some sensitive information from the model. Hence, securing the model against the malicious actors is a challenging task as most of the training data is coming from a source which is not in an organization's control. The source may be an external source or an internal source. This makes the training process of the model vulnerable. In a machine learning pipeline, the attack can happen in different points such as data, training process, model and the application. The adversaries have different restrictions in terms of knowledge of target system. In a white-box attack, the attacker knows everything about the system from the components such as the training data, data features, objective function of the algorithm and the parameters learned after training whereas in a black-box attack, the attacker can only control the training data and observe the output of the system for the submitted input. Also, in the black-box attack the attacker does not have knowledge of the learning algorithm, its parameter and the features used, i.e., the attacker does not know the internal structure of the model. For example, white-box attack is applicable in case of a disgruntled employee (insider threat) and black-box attack is applicable for external threat like competitor or hacker.

Data poisoning attack is a serious threat wherein the adversary may try to degrade the performance of the trained model by injecting a small portion of a poisoned data into the training data. This attack can threaten a variety of applications such as spam filter, malware detection, recommender system and sentiment analysis. Based on the ability of the attacker to manipulate either both the training data and the test data or only the test data, the attack is said to be causative and exploratory respectively. Three types of attackers are considered in the attack space. They are offline attacker, semi-online attacker and fully online attacker. The offline attacker has access to the training data and has the capability to add the poisoning data instances to the clean training data. The semi-online attacker either add or update the examples into a clean data stream irrespective of the position. The semi-online attacker knows entire clean data stream which resembles the offline attacker, but the model updates online. The fully online attacker is capable for adding or updating the data points into a pre-specified position. The fully online attacker degrades the victim model's performance but, over a time period. The sequential/online learner draws different challenges compared to a batch/offline learner. The poisoned data points arrive in sequential manner. Hence identifying a potential poisoned data point in the stream is challenging. Also, a defender does not have the knowledge of the data distribution of the future points in the initial step. Further, the defender is challenged with the distribution shifts over the time horizon.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary block diagram of a system 100 for secure online-learning against data poisoning attack, according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
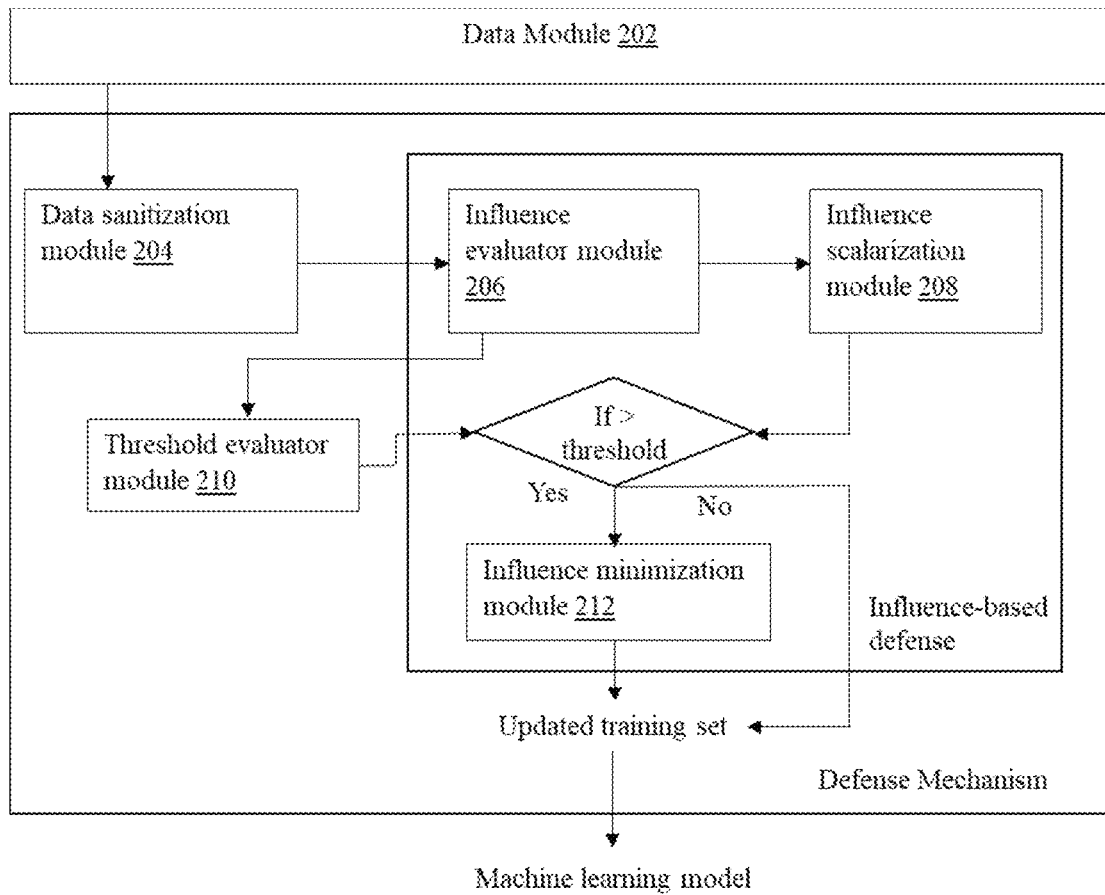
FIG. 2 is a functional block diagram of the system for secure online-learning against data poisoning attack according to some embodiments of the present disclosure.

FIG. 2 is a functional block diagram of the system 100 for secure online-learning against data poisoning attack according to some embodiments of the present disclosure. The functional block diagram comprises a data module 202, a data sanitization module 204, an influence evaluator module 206, an influence scalarization module 208, a threshold evaluation module 210, an influence minimization module 212 and a machine learning model.

According to an embodiment of the disclosure, the data module 202 aggregates a training set from multiple external data sources and the training set is pre-processed to a common representation for the learning algorithms. Examples for external data sources are system events in an intrusion detection system, user feedbacks/review comments on an e-commerce website which is used for training a recommender system and binary samples submitted on an online anti-malware detector service so on. The data sanitization module 204 receives the training set from the data module 202 and outputs a filtered data set. The influence evaluator module 206 generates an influence function by evaluating an influence of the training data set from the data sanitization module. The influence scalarization module 208 generates a scalarized value of the influence function by performing scalarization. The influence minimization module 212 minimizes the influence function and updates the training set for training a machine learning model based on the scalarized value by comparing with a threshold generated by a threshold evaluator module 210. The functionalities and working of the modules are explained in conjunction with FIG. 3A and FIG. 3B in the later part of the disclosure.

Figure 3A:
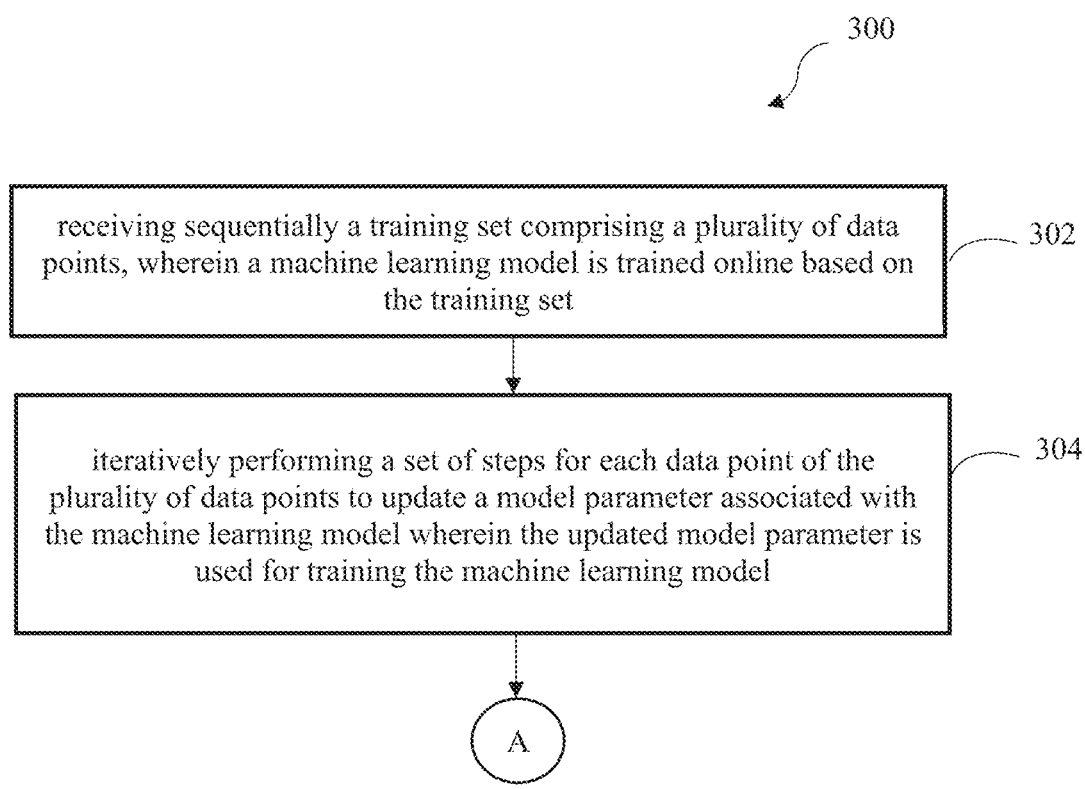
FIG. 3A and FIG. 3B is an exemplary flow diagram illustrating a method for secure online-learning against data poisoning attack according to some embodiments of the present disclosure.
Figure 3B:
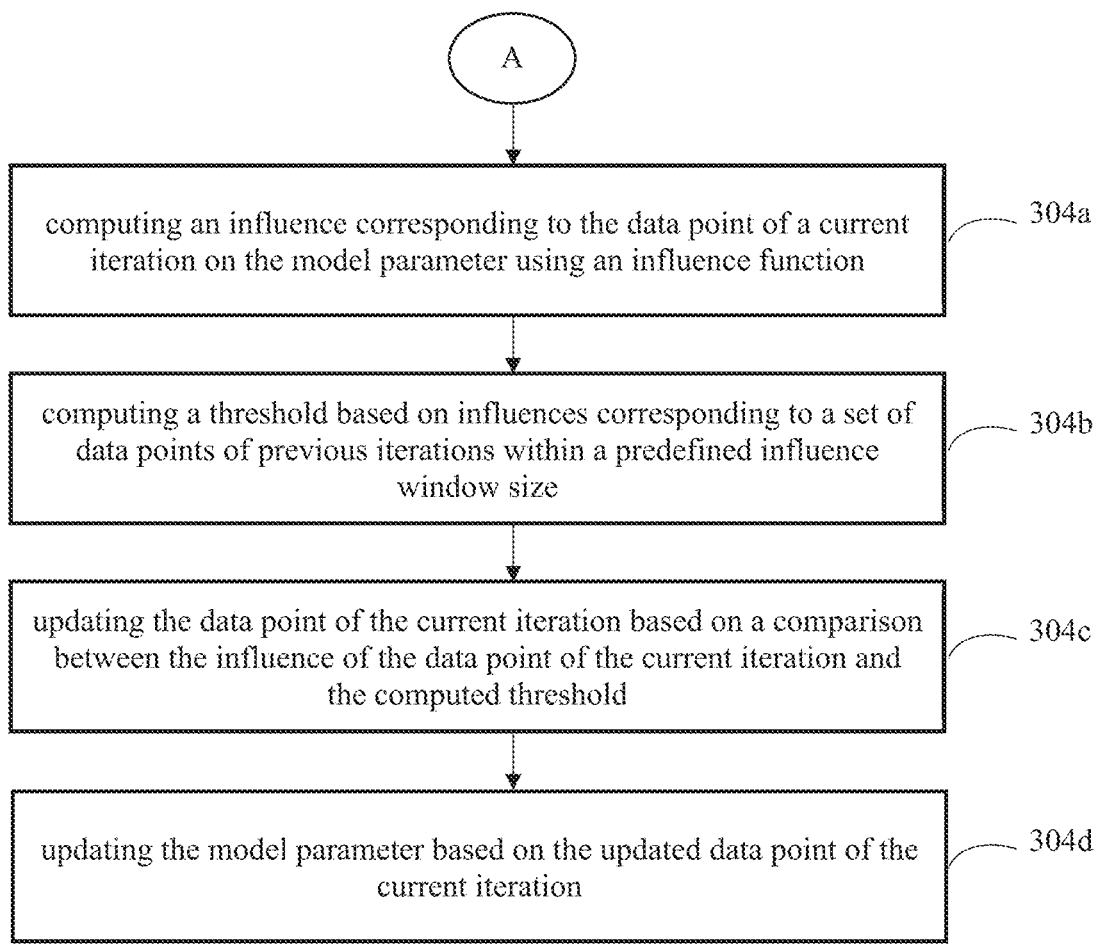

FIG. 3A and FIG. 3B, with reference to FIG. 1 and FIG. 2 is an exemplary flow diagram illustrating a method for secure online-learning against data poisoning attack according to some embodiments of the present disclosure. The steps of the method of the present disclosure will now be explained with reference to the components of the system 100 and the modules 202-212 as depicted in FIG. 1 and FIG. 2, and the flow diagram.

In an embodiment of the present disclosure, the one or more processors 102 are configured to receive sequentially at step 302, a training set comprising a plurality of data points, wherein a machine learning model is trained online based on the training set. The training set is aggregated from a plurality of external data sources and pre-processed to a common representation for the learning algorithms for training the machine learning model using the data module 202. The arrival of training set can be a continuous stream and the training set can be data poisoned at the end or at any location in the stream. A set of data points from the plurality of data points are poisoned data points. The training set D comprises the plurality of data points $D=\{(x,y)\}_1^n$ wherein each data point is represented as $(x_t, y_t)$ where $x_t$ is the feature representation of the data point at instance t which is suitable for learning algorithms and $y_t$ is the target label for the corresponding data point.

In an embodiment of the present disclosure, the one or more processors 102 are configured to iteratively perform at step 304, a set of steps for each data point of the plurality of data points to update a model parameter $\theta$ associated with the machine learning model wherein the updated model parameter is used for training the machine learning model. In an embodiment, the machine learning model is pre-trained using a pre-training data $D_{pre}$ which is basically clean data stream (i.e., before data poisoning begins) to assess the initial state of the model. Let $\theta_0$ be an initial model parameter learned over the pre-training data.

In an embodiment of the present disclosure, the one or more processors 102 are configured to compute at step 304a, an influence corresponding to the data point of a current iteration on the model parameter using an influence function. In an embodiment, the step of computing the influence corresponding to the data point of the current iteration is preceded by checking whether the data point of the current iteration lies in a filtered data set obtained using a sanitization technique. The sanitization is performed by the sanitization module 204 to remove outliers using the sanitization technique. Various data sanitization methods can be considered for performing sanitization to clean the training set partially. One approach to perform the data sanitization is removing one or more outliers. For example, in a binary classification task, let c1 and c2 be the class centroids. The data points that are too far from the class centroids are considered as the outliers which is further removed. Slab defence and sphere defence are well-known techniques to remove the poisoned data points. Sphere defence removes the data point, which is outside a spherical radius, whereas the slab defence projects the data point to a line between the class centroids and then remove the data point which are far from the line. For example, for slab defence sanitization method the filtered data set calculated using the equation (1) given below, $$\mathcal{F}_{slab} \stackrel{def}{=} \{(x,y) : |\langle x-\mu_y, \mu_y - \mu_{-y}\rangle| \leq s_y\} \quad (1)$$

where $D_i=(x,y) \in D$ is the data point of the current iteration, $\mu_y$ and $\mu_{-y}$ are class centroids and $s_y$ is the threshold. The set of steps to update the model parameter is performed only if the data point of the current iteration lies in the filtered data set.

The generation of an influence function is shown by an example explained further. The influence function includes (i) a computed Hessian and (ii) a computed gradient loss parameter associated with the machine learning model. Let L be the loss and $\in$ be a real number for upweighting the data point. The influence of the data point is computed as:

$$I_{(\mathcal{D}_i)} \stackrel{def}{=} \frac{d\hat{\theta}_{\epsilon,D_i}}{d\epsilon}\bigg|_{\epsilon=0} = -H_{\hat{\theta}}^{-1} \nabla_\theta L(\mathcal{D}_i, \hat{\theta}), \quad (2)$$

where H is the Hessian given by, $$H_{\hat{\theta}} \stackrel{def}{=} \nabla^2 R(D, \hat{\theta}) = \frac{1}{n}\sum_{i=1}^{n} \nabla_\theta^2 L(\mathcal{D}_i, \hat{\theta}) \quad (3)$$

$$R(D, \theta) \stackrel{def}{=} \frac{1}{n}\sum_{i=1}^{n} L(\mathcal{D}_i, \theta) \quad (4)$$

$$\hat{\theta}_{\epsilon,D_i} = \underset{\theta \in \Theta}{\operatorname{argmin}}\{R(D_i, \theta) + \epsilon L(\mathcal{D}_i, \theta)\} \quad (5)$$

Loss function is given as $$L(\theta) = \sum_{i=1}^{n} -(y_i \log\sigma(z_i) + (1-y_i)\log(1-\sigma(z_i)))$$

where $z=\theta^T x$, $\sigma(z)$ is the predicted value (between 0 and 1) given a feature in x
The gradient loss is given as below, $$\nabla L(D_i \theta) = \quad (6)$$
$$\frac{\partial L(D_i, \theta)}{\partial \theta^T} = -y_i x_i(1-\sigma(z_i)) + (1-y_i)x_i\sigma(z_i) = x_i(\sigma(z_i) - y_i)$$

In an embodiment of the present disclosure, the one or more processors 102 are configured to compute at step 304b, a threshold based on influences corresponding to a set of data points of previous iterations within a predefined influence window size. The threshold evaluator module 210 computes the threshold of the influence of the data point of the current iteration based on previous influences. The previous influences are parameterized by a window size called 'influence window size'. Influence window size is an integer which is considered for computing the average of the previous influences. Influence window size ($w_{inf}$) is empirically found using grid search. The threshold is computed by calculating an average of the influences corresponding to the set of data points of previous iterations within the influence window size. Let $w_{inf}$ be the window size and [$\inf_1$, $\inf_2$, ..., $\inf_N$] be the previous influences then the threshold will be $$\Sigma_1^N \inf_i / w_{inf} \quad (7)$$

where N is total number of previous influences.

In an embodiment of the present disclosure, the one or more processors 102 are configured to update at step 304c, the data point of the current iteration based on a comparison between the influence of the data point of the current iteration and the computed threshold. The data point of the current iteration is updated by two steps, first step being computing a new data point using a minimization technique if the influence of the data point of the current iteration is greater than the threshold. The equations for minimizing the influence function using the gradient descent are shown by, $$x_t^* = \underset{x}{\operatorname{minimize}} I_{(x)}$$

$$\nabla I_{(x)} = -\nabla H^{-1}(\nabla_\theta L(x, \theta)) \quad (8)$$

$$H = \nabla^2 L(\theta) = \sum_{i=1}^{n} x_i x_i^T \sigma(z_i)(1-\sigma(z_i)) \quad (9)$$

The second step being updating the data point of the current iteration with the new data point if the influence of the data point of the current iteration is greater than an influence of the new data point.

In an embodiment of the present disclosure, the one or more processors 102 are configured to update at step 304d, the model parameter based on the updated data point of the current iteration. The algorithm for influence based defense is shown in Algorithm 1 as below, Algorithm 1

Input: Poisoned Data Stream D = $\{(x, y)\}_1^n$, Pre-training data $D_{pre}$, initial model parameter $\theta_0$ learned over pre-train data
Output: Model parameter $\theta_n$
1: Compute $\mathcal{F}_{slab}(D_{pre})$ on pre-training data using equation (1)
2: for x ∈ D do            //doing for each x from D at time t
3:   Filter $x_t$ based on $\mathcal{F}_{slab}$
4:   if $x_t$ lies into filtered data set $\mathcal{F}_{slab}(D_{pre})$ then
5:     Pre-compute the Hessian using equation (3)
6:     Pre-compute gradient loss using equation (6)
7:     Inf ($x_t$) ← compute the influence using equation (2)
8:     $\text{Inf}_{thres}$ ← average of previous $w_{inf}$ influences
9:     if $\text{Inf}(x_t) \geq \text{Inf}_{thres}$ then
10:      $x_t^*$ = minimize Inf (x) using equation (8)
11:      if $\text{Inf}(x_t) \geq \text{Inf}(x_t^*)$ then
12:        $x_t \leftarrow x_t^*$
13:      end if
14:    end if
15:    $\theta_t$ ← Update $\theta_{t-1}$ using $x_t$
16:  else
17:    continue without updating the $\theta_t$
18:  end if
19: end for
20: return $\theta_n$ EXPERIMENTAL RESULTS: 6 datasets are considered for experiments. Table 1 shows the list of the datasets, number of features used for training the model and the distribution of the data for initialization, training and testing.

TABLE 1

| # | Dataset | Features | Pre-Train | Training | Test |
|---|---------|----------|-----------|----------|------|
| D1 | Australian | 14 | 200 | 300 | 150 |
| D2 | Banknote | 4 | 200 | 400 | 572 |
| D3 | MNIST 1v7 | 50 | 8000 | 1000 | 2163 |
| D4 | Spambase | 57 | 2000 | 1000 | 1519 |
| D5 | UCI Breast Cancer | 9 | 100 | 400 | 100 |
| D6 | Fashion MNIST (Bag versus Sandal) | 50 | 8000 | 1000 | 1000 |

Two existing poisoning attacks on online learning are considered for evaluating the disclosed defense strategy: a) simplistic attack, and b) online attack. In simplistic attack, some data points are appended to clean data points which results in poisoned data points and these poisoned data points are used for training the machine learning model. In online attack, the attacker's objective is to change the state of an existing machine learning model by injecting poisoned data points into the stream of data points. The constant learning rates of 0.01, 0.05 and 0.09 along with an optimal learning rate provided by the scikit-learn to assess the performance of Slab and the disclosed influence based method are used.

Table 2 and Table 3 shows the effectiveness of Slab (S) and the disclosed influence based (I) defenses against simplistic and online attacks. Table 2 and Table 3 shows comparison of results on six datasets for 10% poisoning budget and with different learning rates. The experiments are performed on six different datasets as shown in Table 1. It can be observed that on an average the performance of slab and influence based methods are nearly same for constant learning rate. On the contrary, for an optimal learning rate, the influence based method has far better result than slab for most of the datasets. For example, influence based method is more than 9% accurate than Slab for simplistic attack and more than 30% accurate than online attack for MNIST dataset.

TABLE 2

| | | LR:0.01 | | LR:0.05 | |
|---|---|---|---|---|---|
| | | Simplistic | Online | Simplistic | Online |
| D1 | S | 0.8736 | 0.8736 | 0.8736 | 0.8526 |
| | I | 0.8736 | 0.8736 | 0.8736 | 0.8578 |
| D2 | S | 0.8391 | 0.8671 | 0.8287 | 0.8933 |
| | I | 0.8391 | 0.8671 | 0.806 | 0.8951 |
| D3 | S | 0.9773 | 0.9884 | 0.9242 | 0.9917 |
| | I | 0.9787 | 0.9889 | 0.8974 | 0.9847 |
| D4 | S | 0.8933 | 0.8531 | 0.6893 | 0.7544 |
| | I | 0.8940 | 0.8531 | 0.6899 | 0.7551 |
| D5 | S | 0.92 | 0.88 | 0.94 | 0.53 |
| | I | 0.92 | 0.88 | 0.94 | 0.53 |
| D6 | S | 0.986 | 0.922 | 0.985 | 0.767 |
| | I | 0.986 | 0.926 | 0.988 | 0.733 |

TABLE 3

| | | LR:0.09 | | LR: Optimal | |
|---|---|---|---|---|---|
| | | Simplistic | Online | Simplistic | Online |
| D1 | S | 0.8789 | 0.7947 | 0.8578 | 0.5736 |
| | I | 0.8789 | 0.8052 | 0.8578 | 0.6211 |
| D2 | S | 0.7639 | 0.9161 | 0.4423 | 0.9493 |
| | I | 0.5804 | 0.8951 | 0.4423 | 0.9755 |
| D3 | S | 0.8335 | 0.9801 | 0.6643 | 0.5839 |
| | I | 0.8220 | 0.9810 | 0.7753 | 0.9223 |
| D4 | S | 0.6372 | 0.7281 | 0.6254 | 0.7182 |
| | I | 0.6458 | 0.7228 | 0.6445 | 0.6886 |
| D5 | S | 0.94 | 0.52 | 0.88 | 0.49 |
| | I | 0.94 | 0.68 | 0.88 | 0.71 |
| D6 | S | 0.988 | 0.697 | 0.988 | 0.981 |
| | I | 0.988 | 0.737 | 0.988 | 0.981 |

Figure 4:
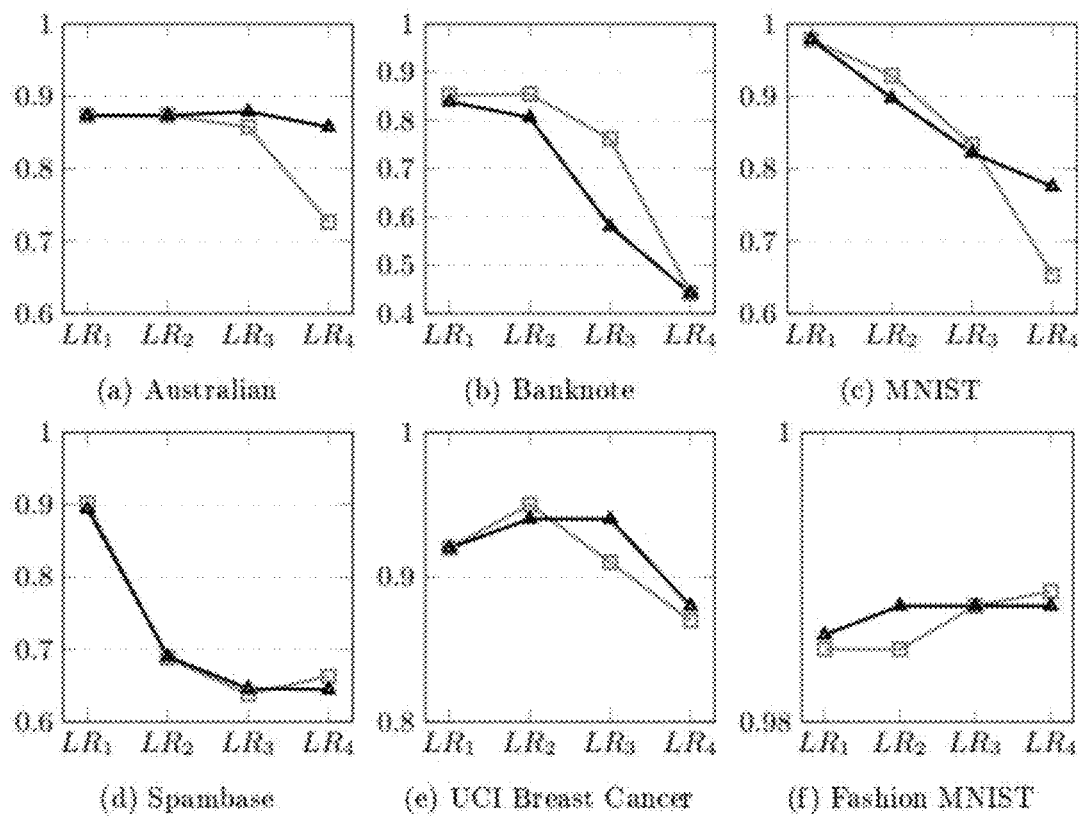
FIG. 4 is graphical illustrations of comparison of accuracy of a classifier with and without influence based defense for simplistic attack for varying learning rates according to some embodiments of the present disclosure.
Figure 5:
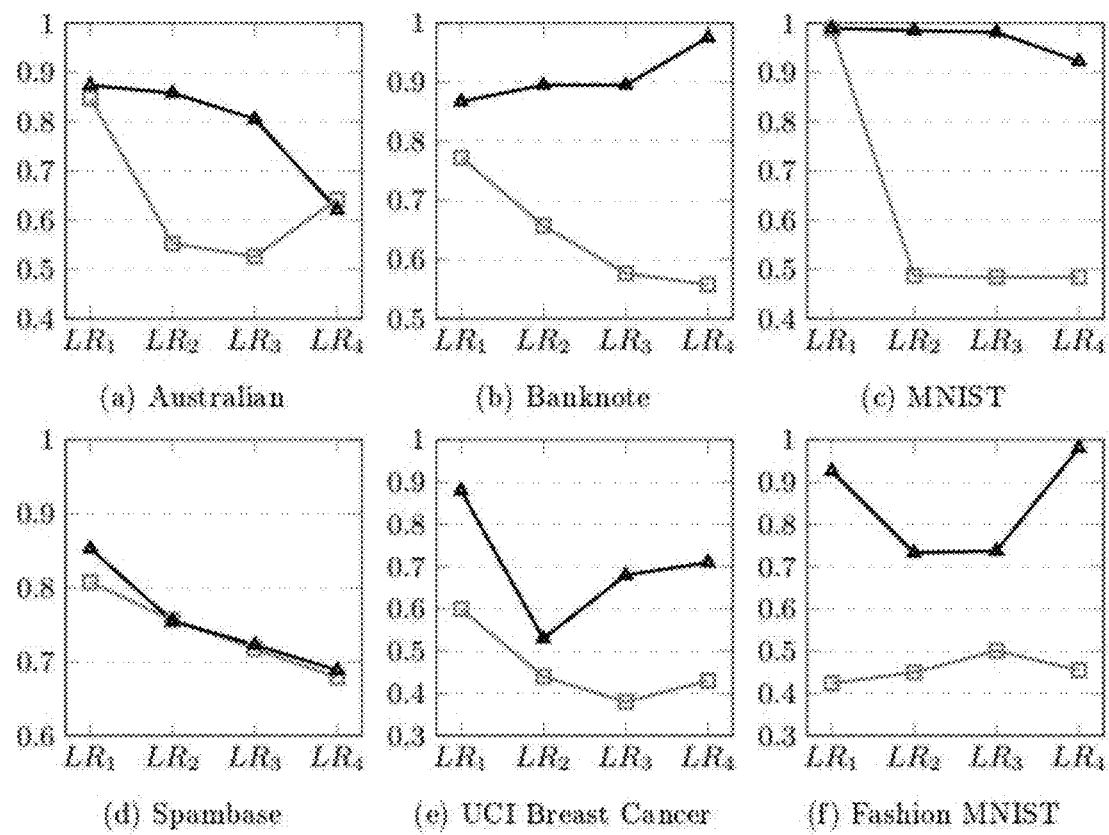
FIG. 5 is graphical illustrations of comparison of accuracy of a classifier with and without influence based defense for online attack for varying learning rates according to some embodiments of the present disclosure.

FIG. 4 illustrates a comparison of accuracy of the classifier with and without influence based defense for simplistic attack for varying learning rates according to some embodiments of the present disclosure. Similarly, FIG. 5 illustrates a comparison of accuracy of the classifier with and without influence defense for the online attack for varying learning rates according to some embodiments of the present disclosure. The poison budget is kept 10% and learning rate is changed from fixed (0.01, 0.05, 0.09) to optimal. The accuracy of the classifier degrades more with optimal learning rate and in absence of a defense. For online attack the disclosed method works well to improve the accuracy in most cases. On the contrary, for simplistic attack the disclosed defense method has relatively lower performance as the poisoned data points are added in the filtered data set only, that is irrespective of their influence.

The disclosed method considers an influence-based defense approach to minimize the impact of the poisoned data points on the machine learning model in an online setup. The embodiment of the disclosed method provides a secure online-learning model for the application against data poisoning attacks. The method initially performs a data sanitization process wherein a subset of poisoned data points in the training data are filtered out. Further an influence minimization is performed wherein the influence of the data points after data sanitization is computed and minimized based on a threshold. Updated data points for the learning model are generated and used for training the machine learning model.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for secure online-learning against data poisoning attack, the method comprising:

receiving sequentially, via one or more hardware processors, a training set comprising a plurality of data points, wherein a machine learning model is trained online based on the training set; and iteratively performing, via the one or more hardware processors, a set of steps for each data point of the plurality of data points to update a model parameter associated with the machine learning model wherein the updated model parameter is used for training the machine learning model, wherein the set of steps comprises:

computing, via the one or more hardware processors, an influence corresponding to the data point of a current iteration on the model parameter using an influence function;

computing, via the one or more hardware processors, a threshold based on an average of influences corresponding to a set of data points of previous iterations within a predefined influence window size;

updating, via the one or more hardware processors, the data point of the current iteration based on a comparison between the influence of the data point of the current iteration and the computed threshold; and updating, via the one or more hardware processors, the model parameter based on the updated data point of the current iteration if the data point of the current iteration lies in a filtered data set obtained using a sanitation technique.

2. The processor implemented method of claim 1, wherein a set of data points from amongst the plurality of data points are poisoned data points.

3. The processor implemented method of claim 1, wherein the set of steps to update the model parameter is performed only if the data point of the current iteration lies in the filtered data set.

4. The processor implemented method of claim 1, wherein the influence function includes (i) a computed Hessian and (ii) a computed gradient loss parameter associated with the machine learning model.

5. The processor implemented method of claim 1, wherein updating the data point of the current iteration based on the comparison between the influence of the data point of the current iteration and the threshold comprises:

computing a new data point using a minimization technique if the influence of the data point of the current iteration is greater than the threshold; and updating the data point of the current iteration with the new data point if the influence of the data point of the current iteration is greater than an influence of the new data point.

6. A system, comprising:
a memory storing instructions;
one or more communication interfaces; and
one or more hardware processors coupled to the memory via the one or more communication interfaces, wherein the one or more hardware processors are configured by the instructions to:

receive sequentially a training set comprising a plurality of data points, wherein a machine learning model is trained online based on the training set; and iteratively perform a set of steps for each data point of the plurality of data points to update a model parameter associated with the machine learning model wherein the updated model parameter is used for training the machine learning model, wherein the set of steps comprises:
  compute an influence corresponding to the data point of a current iteration on the model parameter using an influence function;
  compute a threshold based on an average of influences corresponding to a set of data points of previous iterations within a predefined influence window size;
  update the data point of the current iteration based on a comparison between the influence of the data point of the current iteration and the computed threshold; and
  update the model parameter based on the updated data point of the current iteration if the data point of the current iteration lies in a filtered data set obtained using a sanitation technique.

7. The system of claim 6, wherein a set of data points from amongst the plurality of data points are poisoned data points.

8. The system of claim 6, wherein the set of steps to update the model parameter is performed only if the data point of the current iteration lies in the filtered data set.

9. The system of claim 6, wherein the influence function includes (i) a computed Hessian and (ii) a computed gradient loss parameter associated with the machine learning model.

10. The system of claim 6, wherein updating the data point of the current iteration based on the comparison between the influence of the data point of the current iteration and the threshold comprises:
  computing a new data point using a minimization technique if the influence of the data point of the current iteration is greater than the threshold; and
  updating the data point of the current iteration with the new data point if the influence of the data point of the current iteration is greater than an influence of the new data point.

11. One or more non-transitory machine readable information storage mediums comprising one or more instructions, which when executed by one or more hardware processors causes a method for:
  receiving sequentially a training set comprising a plurality of data points, wherein a machine learning model is trained online based on the training set; and
  iteratively performing a set of steps for each data point of the plurality of data points to update a model parameter associated with the machine learning model wherein the updated model parameter is used for training the machine learning model, wherein the set of steps comprises:
    computing an influence corresponding to the data point of a current iteration on the model parameter using an influence function;
    computing a threshold based on an average of influences corresponding to a set of data points of previous iterations within a predefined influence window size;
    updating the data point of the current iteration based on a comparison between the influence of the data point of the current iteration and the computed threshold; and
    updating the model parameter based on the updated data point of the current iteration if the data point of the current iteration lies in a filtered data set obtained using a sanitation technique.

* * * * *